S. GARDNER.

Rest for Supporting a Glass Bowl Underneath a Gas-Burner.

No. 126,140.  Patented April 30, 1872.

Witnesses
Albert H. Hook
Jacob P. Pfanner

Inventor
Smith Gardner 126,140

UNITED STATES PATENT OFFICE.

SMITH GARDNER, OF NEW YORK, N. Y., ASSIGNOR TO J. HENRY DARLINGTON, OF SAME PLACE.

IMPROVEMENT IN RESTS FOR SUPPORTING GLASS BOWLS UNDERNEATH HORIZONTAL GAS-BURNERS.

Specification forming part of Letters Patent No. 126,140, dated April 30, 1872.

I, SMITH GARDNER, of the city, county, and State of New York, have invented an Improvement in Hanging Water-Bowls under Gas-Burners, which is fully explained in the following specification and accompanying drawing.

Figure 1:
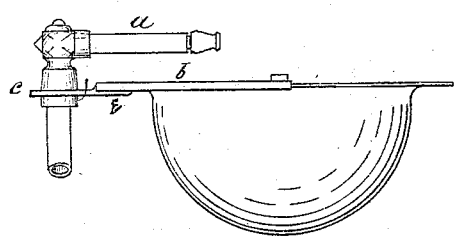
Figure 2:
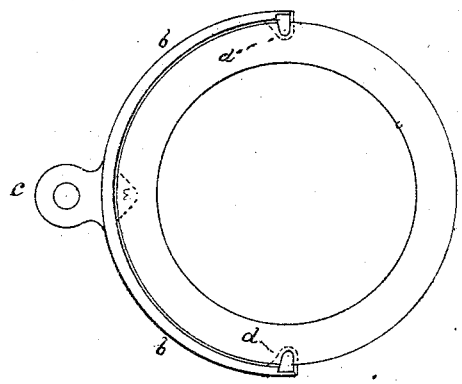
Figure 3:
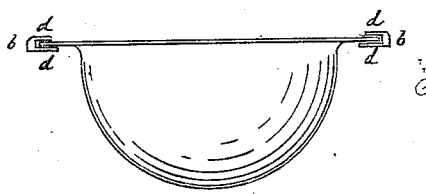

Figure 1 is a side view of a bowl hung in the manner invented by me; Fig. 2, a plan view of the same, and of the rest on which the bowl hangs.

$a$ is a horizontal burner, attached to a gas-pipe and extending out over the hanging bowl. $b$ is a curved rest, on which the bowl hangs. A flattened arm, $c$, projects out about an inch from the back or crown of the rest, and is attached to the gas-pipe directly under the burner. The curve of the rest corresponds with the circumference of the rim of the bowl. $d\ d\ d\ d$ are jaws, which protrude from the prongs of the rest, and grasp the rim of the bowl and hold it in the position required. $e$ represents a lip, which projects from the back part of the rest under the rim of the bowl.

What I claim as my invention, and desire to secure by Letters Patent, is—

The curved rest $b$ provided with arm $c$, jaws $d\ d$, and lip $e$, all constructed substantially as and for the purpose described.

SMITH GARDNER.

Witnessed by—
T. H. DARLINGTON,
J. P. HANNER.